HOLCROFT & SMITH.
Wagon-Brake.
No. 43,991.            Patented Aug. 30, 1864.
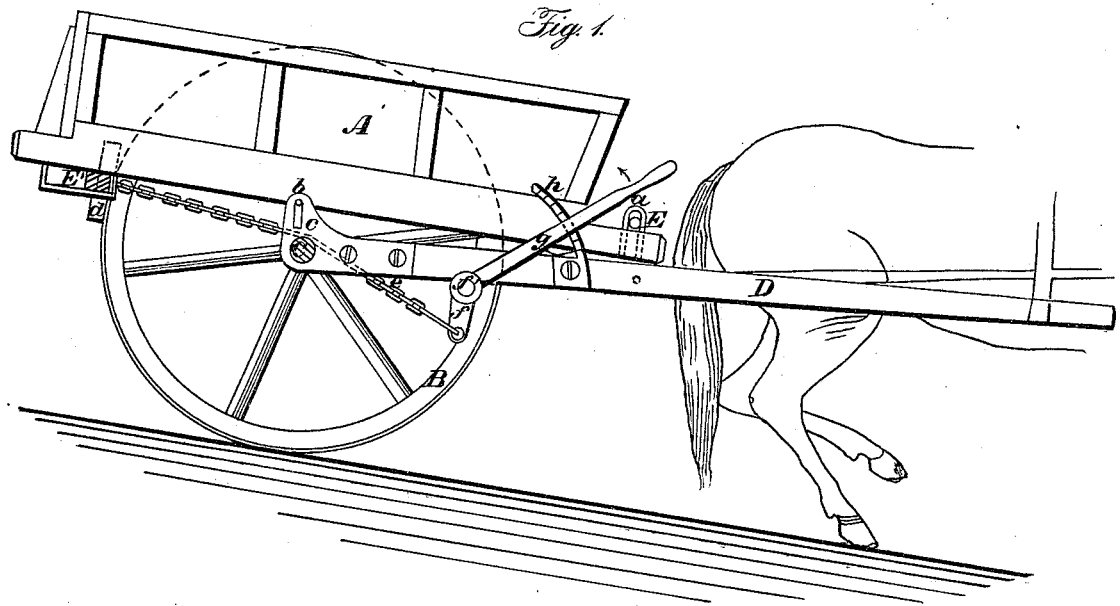
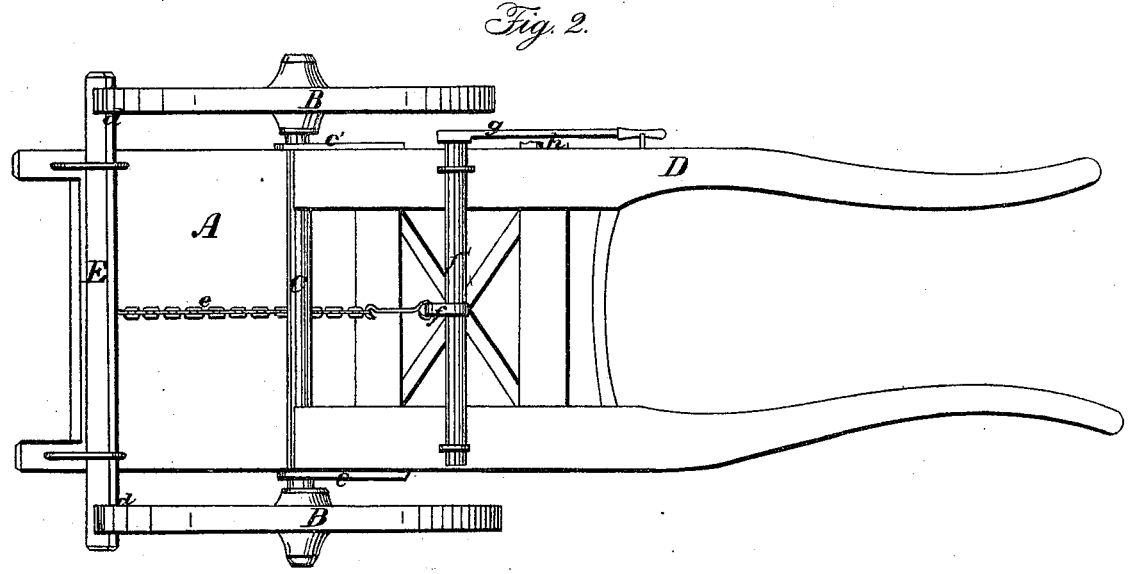
Witnesses:          Inventor:

UNITED STATES PATENT OFFICE.

HENRY HOLCROFT AND C. S. SMITH, OF MEDIA, PENNSYLVANIA.

IMPROVEMENT IN CARTS.

Specification forming part of Letters Patent No. 43,991, dated August 30, 1864.

*To all whom it may concern:*

Be it known that we, H. HOLCROFT and C. S. SMITH, both of Media, in the county of Delaware and State of Pennsylvania, have invented a new and useful Improvement in Carts; and we do hereby declare that the following is a full, clear, and exact description thereof, which will enable those skilled in the art to make and use the same, reference being had to the accompanying drawings, forming part of this specification, in which—

Figure 1 represents a sectional side elevation of our invention. Fig. 2 is an inverted plan of the same.

Similar letters of reference indicate corresponding parts.

Carts of the ordinary construction in going down hill are stopped or prevented from crowding on the horse by the application of a brake, the shoes of which act simply by friction on the peripheries of the wheels, and the effect of the brake therefore depends entirely upon the force with which the shoes are drawn up against the wheels; but the wheels are generally not perfectly round, and the chains or other parts connecting the brake with the brake-lever are liable to stretch, so that in going down long and steep hills constant attention must be paid to the brake, and even then the cart cannot be prevented from crowding on the horse at short intervals, and to subject the same to severe jerks. In order to overcome this difficulty, the body of the cart which forms the subject of this invention is connected to the axle of the driving-wheel so that it can rise and fall in the center, and when the brakes are applied the action of the wheels on the brakes causes the body of the cart to rise and ride on the wheels, and the weight of the load itself assists in keeping the brakes applied and preventing the cart from crowding on the horse.

A represents the box of a cart, which is provided with two wheels, B, running on the ends of the axle C. From the axle extend the thills D, to which the horse is hitched, and the box rests upon the axle and is held in position by a bar, E, which passes over the front ends of the longitudinal side rails of the box, and through loops or staples $a$, rising from the thills. If the bar E is removed, the rear end of the box tilts down to dump its contents at the desired spot.

Instead of connecting the box to the axle by suitable straps or loops, the box of our cart is placed loosely on the axle, and it is held in place by studs $b$, which pass through slotted ears $c$, rising from the inner ends of the thills on either side of the box. By this arrangement the box is allowed to rise from the axle to a position shown in Fig. 1 of the drawings, or it can sink down and rest upon the axle in the ordinary manner.

It is obvious that instead of the slotted ears other devices might be used, such as slotted straps attached to the box and catching over the axle; and we do not wish to confine ourselves to the precise mechanical arrangement shown in the drawings.

E is the brake-bar, which is provided with shoes $d$ in the ordinary manner, and which connects by a chain, $e$, with an arm, $f$, extending from the rock-shaft $f'$, to the end of which the hand-lever $g$ is rigidly attached, so that by throwing said hand lever in the direction of the arrow marked near it in Fig. 1 the brakes are applied. This hand-lever is made adjustable by a serrated arc, $h$, or in any other suitable manner. If the cart is going down hill and the brakes are applied, the friction of the wheels on the shoes causes the box to rise to the position shown in Fig. 1, and the rear end of said box rides upon the wheels, keeping the shoes continually in contact with the peripheries of the wheels, even if the latter should not be perfectly round. The cart is thus prevented from crowding on the horse, even on the steepest hill, and the brake, after it has been applied, requires no further attention from the driver.

We claim as new and desire to secure by Letters Patent—

The slotted ears $c$, in combination with the box A, thills D, and brake E, constructed and operating substantially as and for the purpose herein shown and described.

HENRY HOLCROFT.
C. S. SMITH.

Witnesses:
WILLIAM MERCER,
ROBERT S. SMITH.